(12) United States Patent
Enoki

(10) Patent No.: US 6,661,406 B1
(45) Date of Patent: Dec. 9, 2003

(54) TOUCH PANEL COORDINATE ROTATION DEVICE

(75) Inventor: Atuya Enoki, Sapporo (JP)

(73) Assignee: NEC Corporation, Tokyo (JP)

( * ) Notice: Subject to any disclaimer, the term of this patent is extended or adjusted under 35 U.S.C. 154(b) by 374 days.

(21) Appl. No.: 09/688,352

(22) Filed: Oct. 16, 2000

(30) Foreign Application Priority Data

Oct. 19, 1999 (JP) .......................................... 11-297451

(51) Int. Cl.[7] .................................................. G09G 5/00
(52) U.S. Cl. ........................ 345/173; 345/174; 345/175; 345/176; 345/178; 345/177; 345/180
(58) Field of Search ................................ 345/178, 173, 345/174, 175, 176, 177, 180

(56) References Cited

U.S. PATENT DOCUMENTS

| | | | | |
|---|---|---|---|---|
| 5,644,689 A | * | 7/1997 | Ban et al. ................... | 395/124 |
| 5,861,874 A | * | 1/1999 | Joto ............................. | 345/173 |
| 5,864,335 A | * | 1/1999 | Kazunuki et al. ........... | 345/173 |
| 6,353,434 B1 | * | 3/2002 | Akebi et al. ................. | 345/173 |

FOREIGN PATENT DOCUMENTS

| | | |
|---|---|---|
| JP | 58-205188 | 11/1983 |
| JP | 59-165182 | 9/1984 |
| JP | 5-73203 | 3/1993 |
| JP | 6-171516 | 6/1994 |
| JP | 7-121156 | 5/1995 |
| JP | 10-23242 | 1/1998 |
| JP | 11-175228 | 7/1999 |
| JP | 11-288460 | 10/1999 |

* cited by examiner

Primary Examiner—Richard Hjerpe
Assistant Examiner—Ali Zamani
(74) Attorney, Agent, or Firm—Young & Thompson

(57) ABSTRACT

A touch panel coordinate rotation device is provided in a touch panel device that includes a touch panel provided on the image plane of a display device and a coordinate detecting device for detecting the touched position on the touch panel and outputting the coordinates of the touched position. The touch panel coordinate rotation device can rotate the coordinates of a touch panel at a desired angle. The touch panel coordination rotation device includes a memory device for storing a rotation angle of an image on the display device based on the standard angle, and a coordinate calculating device for calculating the new coordinates by rotating the coordinate output from the coordinate detecting device at the rotation angle stored in the memory device, when the rotation angle stored in the memory device is not 0.

1 Claim, 6 Drawing Sheets

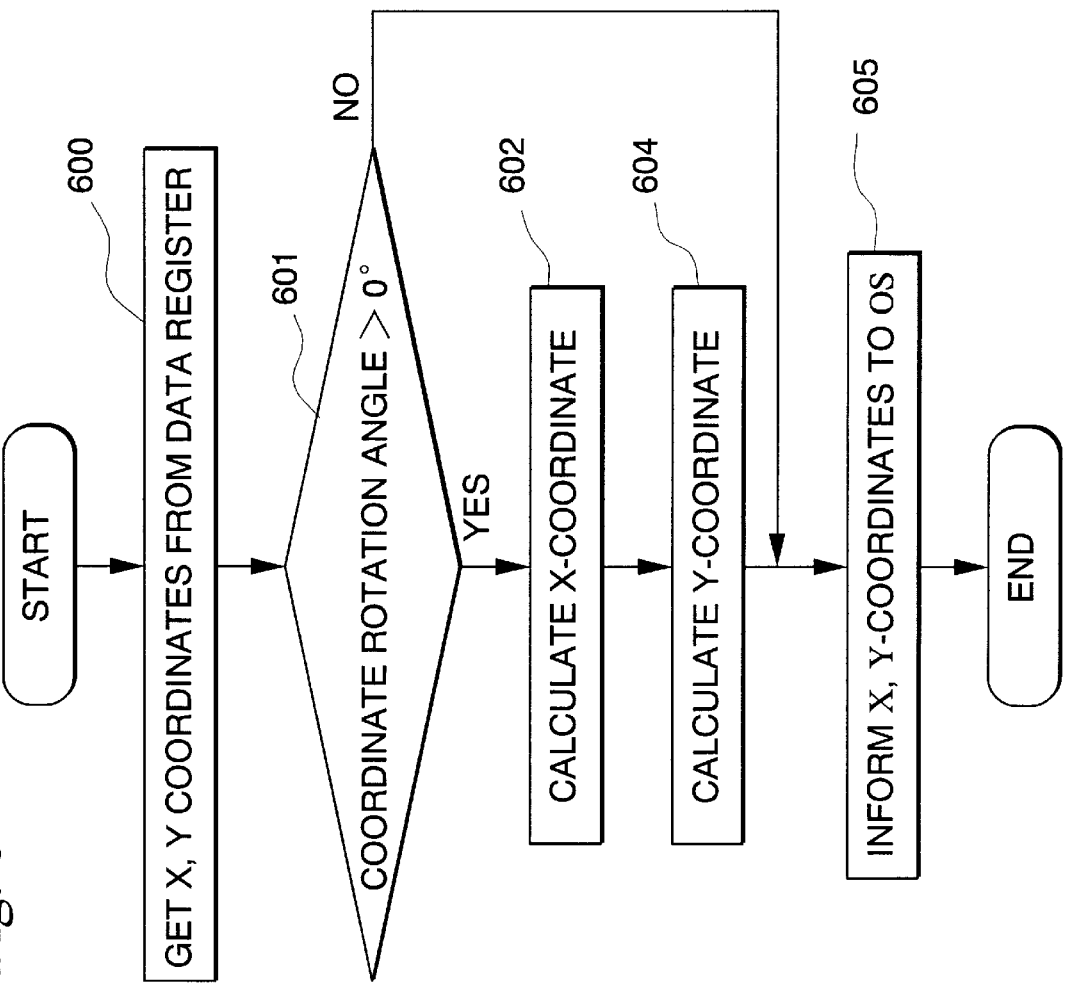

TOUCH PANEL COORDINATE ROTATION DEVICE

BACKGROUND OF THE INVENTION

1. Field of the Invention

The present invention relates to a touch panel coordinate rotation device, which rotates the coordinates of a touch panel provided on an image plane provided in a display.

This application is based on Japanese Patent Application No. Hei 11-297451, the contents of which are incorporated herein by reference.

2. Description of the Related Art

Recently, an information processing system has been used as a display means, an information retrieval means, etc. in public facilities and commercial areas. Moreover, an information processing device provided with an input system using a keyboard has been used. However, an information processing device provided with an input system using a touch panel can be easily used by people inexperienced with the information processing system; therefore, it is widely noticed. Furthermore, a keyboard area having a sufficient size for easy use is rarely provided in a compact information processing device which is so called "portable information terminal"; therefore, in general, a touch panel is provided in the compact information processing device, instead of the keyboard.

Under these circumstances, display controllers, which can rotate and display an image plane drafting on a display facing the user, has been commercialized. Accompanying the rotation of the image plane, an information process which can rotate a coordinate input by the use of a touch panel at an optional angle has been desired.

Japanese Unexamined Patent Application, First Publication No. Hei 06-171516 discloses a display device and an input device related to the touch panel coordinate rotation device. An object of the invention disclosed in this document is to provide a display device and an input device installed in a rotary unit, with which the reading of information is facilitated and the ease of operation is enhanced. However, this document merely discloses a device which can judge a rotation angle of the touch panel based on the motion amount of the rotary unit in the rotating direction. Therefore, it is impossible to judge the rotation angle of the touch panel when the rotary unit comprising the touch panel does not rotate.

It is therefore an object of the present invention to provide a touch panel coordinate rotation device, which can rotate the coordinates of a touch panel to a desired angle, when the rotary unit comprising the touch panel does not rotate.

SUMMARY OF THE INVENTION

According to one aspect of the present invention, the present invention provides a touch panel coordinate rotation device which is provided in a touch panel device comprising a touch panel provided on the image plane of a display device and a coordinate detecting device for detecting the touched position on the touch panel and outputting the coordinates of the touched position, comprising:

a memory device for storing a rotation angle of an image on the display device based on a standard angle; and a coordinate calculating device for calculating new coordinates by rotating the coordinate output from the coordinate detecting device at the rotation angle stored in the memory device, when the rotation angle stored in the memory device is not 0.

In particular, it is preferable that the coordinate calculate device calculates the new coordinates using the following formulas:

$$X'=X \cos \theta + Y \sin \theta$$

$$Y'=Y \cos \theta - X \sin \theta$$

wherein X and Y mean the coordinates output from the coordinate detecting device, X' and Y' mean the coordinates output from the coordinate calculating device, and θ means the rotation angle stored in the memory device.

According to the touch panel coordinate rotation device of the present invention, it is possible to rotate the coordinates of a touch panel to a desired angle when the rotary unit comprising the touch panel does not rotate.

BRIEF DESCRIPTION OF THE DRAWINGS

FIG. 6 is a flow chart for showing the rotation coordinate calculating program used in the touch panel coordinate rotation device.

DESCRIPTION OF THE PREFERRED EMBODIMENT

An embodiment of the touch panel coordinate rotation device according to the present invention will be explained referring to the Figures.

Figure 1:
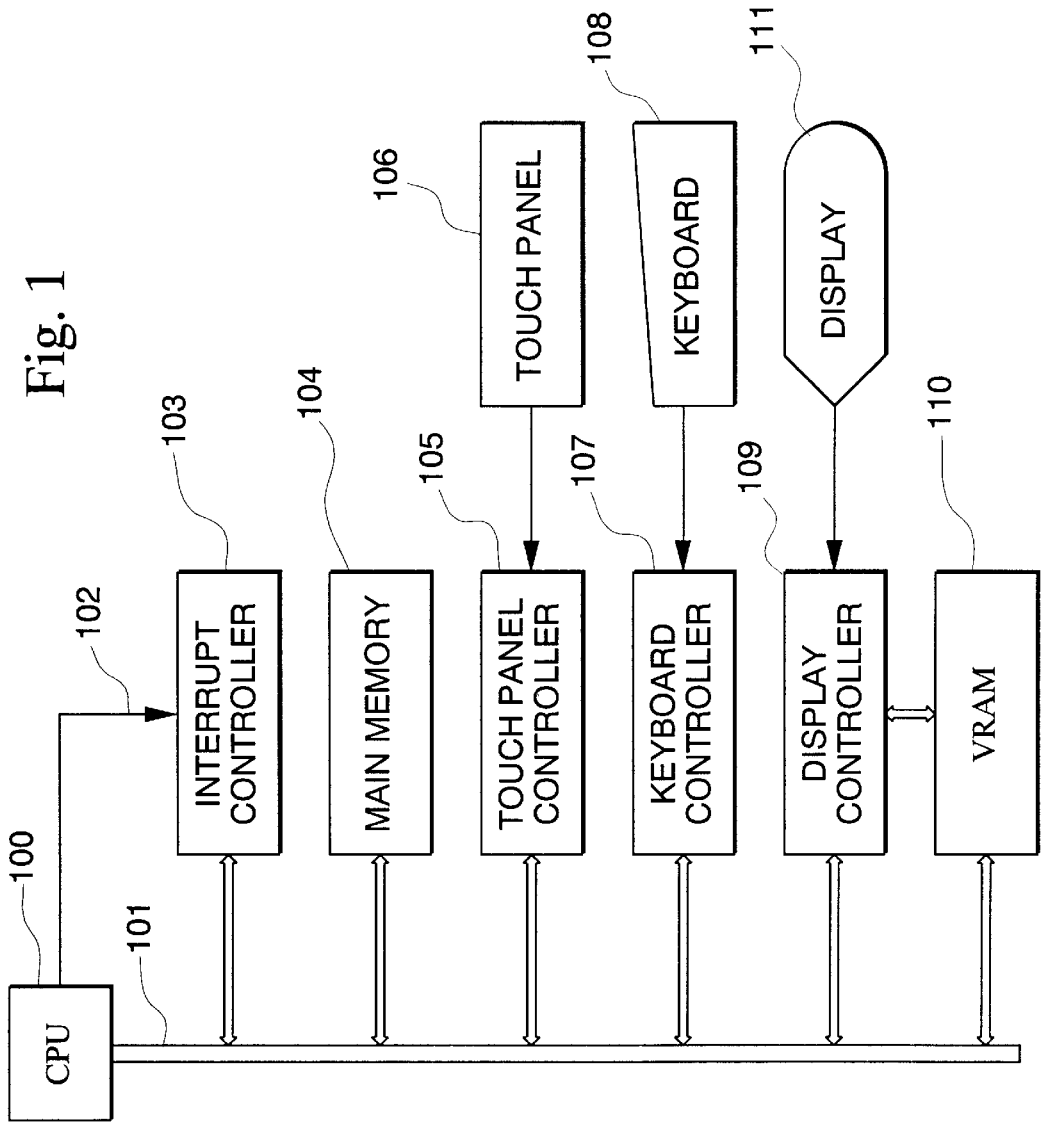
FIG. 1 is a block diagram showing one embodiment of the touch panel coordinate rotation device according to the present invention.

FIG. 1 is a block diagram showing one embodiment of the touch panel coordinate rotation device according to the present invention. In FIG. 1, reference numeral 100 denotes the central processing unit (abbreviated as "COY" below), 103 denotes the interrupt controller which outputs an interrupt signal to the CPU 100, via the interrupt line 102, when the interrupt signal is received from the touch panel controller 105 and the keyboard controller 107, via the system bus 101, and 104 denotes the main memory which stores various programs, such as an operating system, etc.

Figure 3:
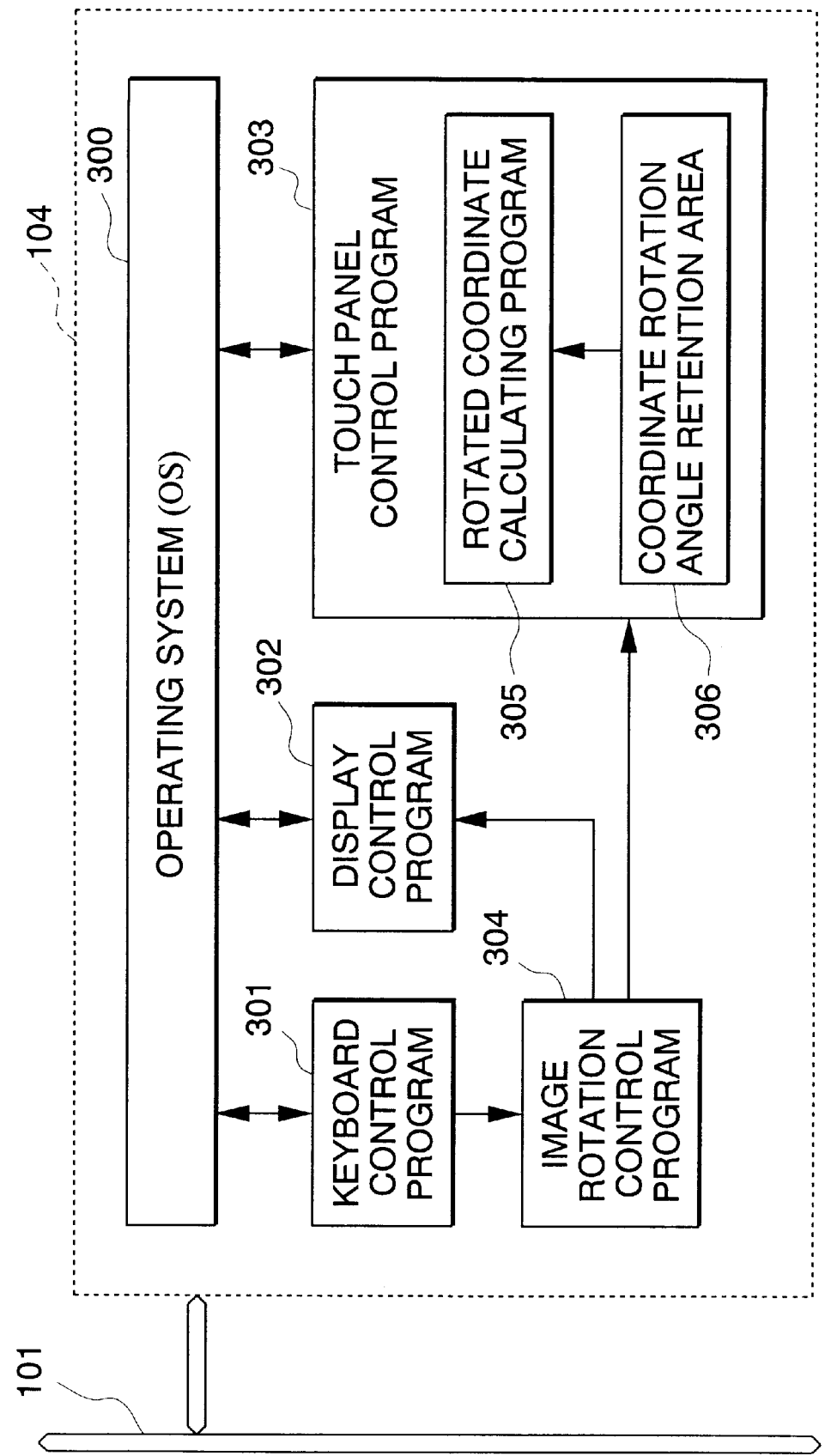
FIG. 3 is a block diagram showing the main memory provided in the touch panel coordinate rotation device.

FIG. 3 is a block diagram showing the main memory 104. In FIG. 3, reference numeral 300 denotes the operating system (abbreviated as "OS" below) which controls the following various programs, and 301 denotes the keyboard control program which provides the instructions by the keyboard controller 107 and the keyboard 108 to the OS 300. Reference numeral 302 denotes the display control program which controls the display controller 109, whereby makes the display 111 is made to rotate an image at a desired angle and draft the image, and 303 denotes the touch panel control program which controls the touch panel controller 105 and provides the coordinate of the point touched by user to the OS 300. Reference numeral 304 denotes the image rotation control program which executes when the predetermined key in the keyboard 108 is operated, whereby the display control program 302 and the touch panel control program 303 are instructed to rotate the image. Reference numeral 305 denotes the rotated coordinate calculating program which calculates the new coordinate after rotation at an angle retained in the coordinate rotation angle retention area 306 based on the coordinate gotten from the touch panel controller 105, when the rotation angle retained in the coordinate rotation angle retention area 306 is larger than 0. The coordinate rotation angle retention area 306 retains the coordinate rotation angle assigned by the image rotation control program 304.

As shown in FIG. 1, the touch panel controller 105 connects the touch panel 106, and detects the X and Y coordinates of the position on the touch panel 106 touched by the user. Moreover, the detection is carried out using the difference of the interfilm resistance when the user touches the touch panel 106 and the interfilm resistance when the user does not touch the touch panel 106.

Figure 2:
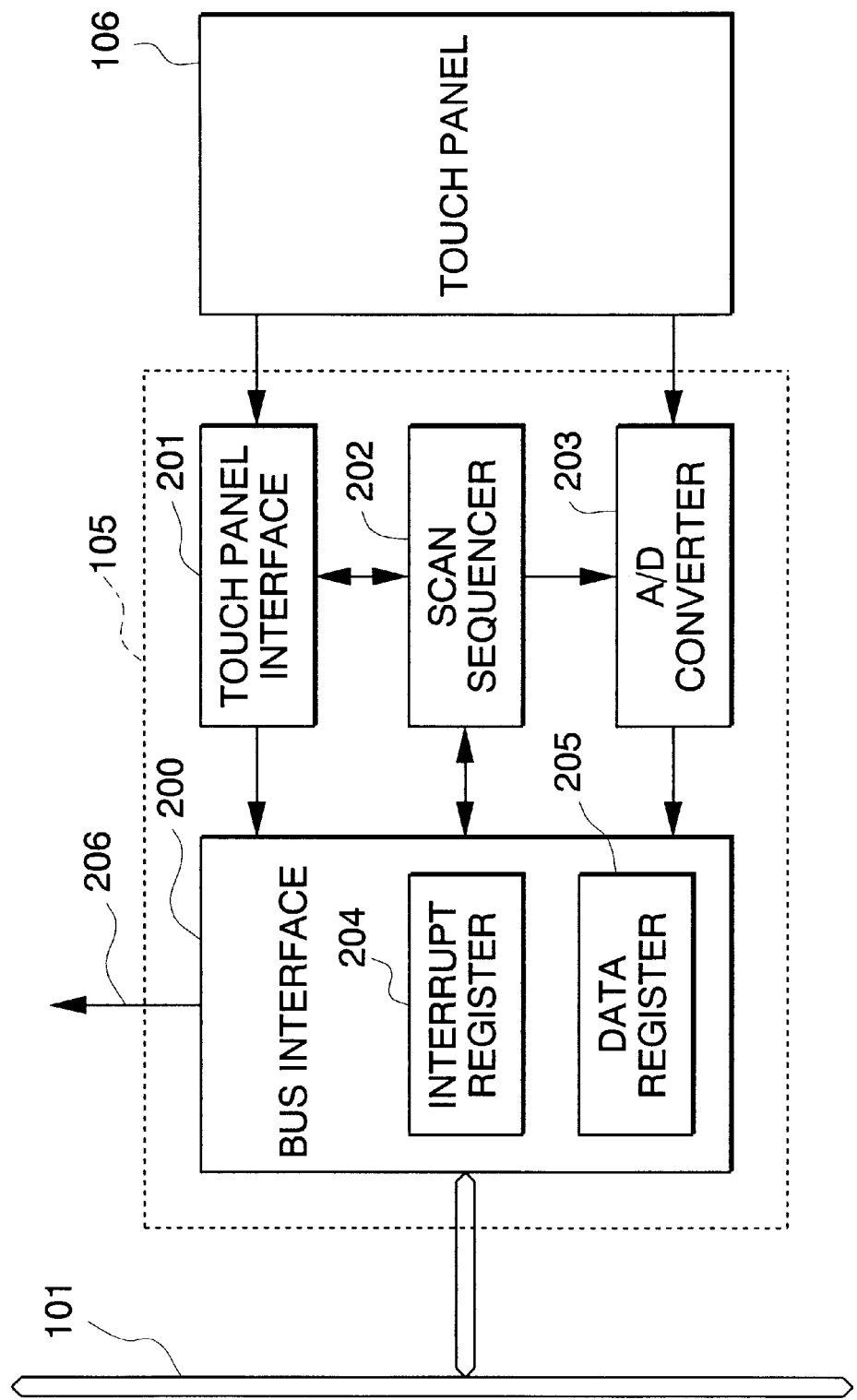
FIG. 2 is a block diagram showing the touch panel controller provided in the touch panel coordinate rotation device.

FIG. 2 is a block diagram showing the touch panel controller 105. In FIG. 2, reference numeral 200 denotes the bus interface which comprises the interrupt register 204 and the data register 205 and interfaces the system bus 101 with the interrupt line 206 and 204 denotes the interrupt register which outputs the interrupt signal to the interrupt controller 103, via the interrupt line 206, after the A/D converter 203 converts the voltage, and 205 denotes the data register for storing the X and Y coordinates which are converted by the A/D converter 203.

Reference numeral 201 denotes the touch panel interface which adjusts the voltage applied to the X/Y-direction resistance film provided in the touch panel 106, and 202 denotes the scan sequencer which controls the touch panel interface 201 and the A/D converter 203 to respond to the instructions from the CPU 100. The A/D converter 203 converts into digital voltage the analog voltage obtained from the touch panel 106.

The touch panel 106 shown in FIG. 1 is a resistance film type touch panel. Moreover, the touch panel 106 can adopt an analog capacity connection system or an electrostatic capacity connection system which operates due to the capacitive coupling between the user's finger and the magnetic field formed on the panel. The keyboard controller 107 connects the keyboard 108, and it detects the operated key by scanning the key matrix switches. The keyboard 108 comprises n×m (n and m denote integers greater than 1) key matrix switches.

The display controller 109 rotates the data of the VRAM (Video Random Access Memory) 110 at a desired angle and drafts the data to the display 111. The VRAM 110 comprises one or more plane.

Moreover, unwanted components can be omitted in this embodiment.

Below, the operation of the touch panel coordinate rotation device will be explained referring to the Figures.

This embodiment can be used in a popular computer system loading a Microsoft Windows Operating System. When the user operates a specified key on the keyboard 108, the keyboard controller 107 scans the keyboard matrix, reads the data, and outputs the interrupt signal to the interrupt controller 103.

When the interrupt controller 103 receives the interrupt signal, it outputs the interrupt signal to the CPU 100, via the interrupt line 102. Then the CPU 100 interrupts the executing run, transfers the kernel mode, and executes the routine called as interrupt handler of the OS 300. The interrupt handler of the OS 300 examines the interrupt received in the CPU 100 from the interrupt controller 103, and calls the interruption handling routine from the keyboard control program 301. The interruption handling routine of the keyboard control program 301 calculates the rotation angle based on the data readout by the keyboard controller 107, and executes the image rotation control program 304. Moreover, it is preferable that the coordinate rotation angle assigned by the keyboard control program 301 is assigned in advance to an operating key.

Figure 5:
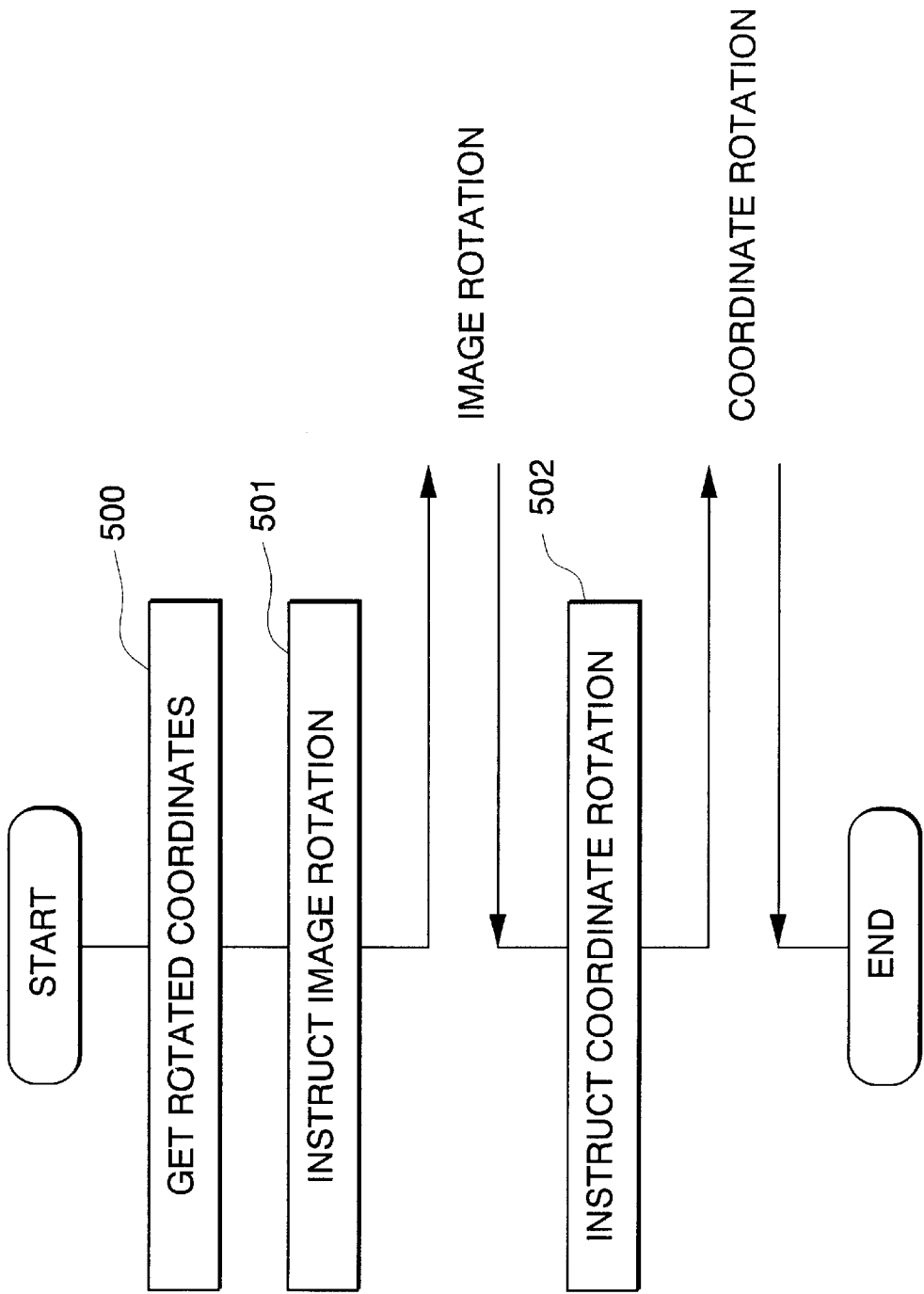
FIG. 5 is a flow chart for showing the image rotation control program used in the touch panel coordinate rotation device.

FIG. 5 is a flow chart showing the image rotation control program 304. The image rotation control program 304 reads the rotation angle calculated by the keyboard control program 301 (step 500), then instructs the display control program 302 to rotate the image at the rotation angel read in step 500.

When the display control program 302 rotates the image, the image rotation control program 304 instructs the touch panel control program 303 to rotate the coordinates at the rotation angle read in the step 500 (step 502). Next, the touch panel control program 303 retains the coordinate rotation angle in the coordinate rotation angle retention area.

When the user touches the touch panel 106, the fact is transmitted to the scan sequencer 202 via the touch panel interface 201. The scan sequencer 202 makes the A/D converter 203 read the voltage of the touch panel 106. The AID converter 203 A/D converts the voltage, and stores the voltage in the data register 205.

The bus interface 200 stores the interrupt in the interrupt register 204, furthermore outputs the interrupt signal in the interrupt controller 103, via the interrupt line 206. When the interrupt controller 103 outputs the interrupt signal to the CPU 100, the CPU 100 interrupts the executing run, transfers the kernel mode, and executes the routine called as interrupt handler of the OS 300.

The interrupt handler of the OS 300 examines the kind of interrupt signal received in the CPU 100 from the interrupt controller 103, and calls the interruption handling routine from the touch panel control program 303. The touch panel control program 303 executes the rotated coordinate calculating program 305.

FIG. 6 is a flow chart showing the operation of the rotated coordinate calculating program 305. The rotated coordinate calculating program 305 reads the digital value of the X and Y-coordinates from the data register 205 (step 600), and then determines whether the rotation angle stored in the coordinate rotation angle retention area 306 is larger than 0. When it is larger than 0, the rotated coordinate calculating program 305 calculates the X-coordinate after rotation, based on the rotation angle and the X-coordinate (length in the X-direction) (step 602). When the reference numerals shown in FIG. 4 are used, the formula for calculating the X-coordinate after rotation is:

$$X'=X \cos \theta + Y \sin \theta \quad \text{(Formula 1)}$$

Figure 4:
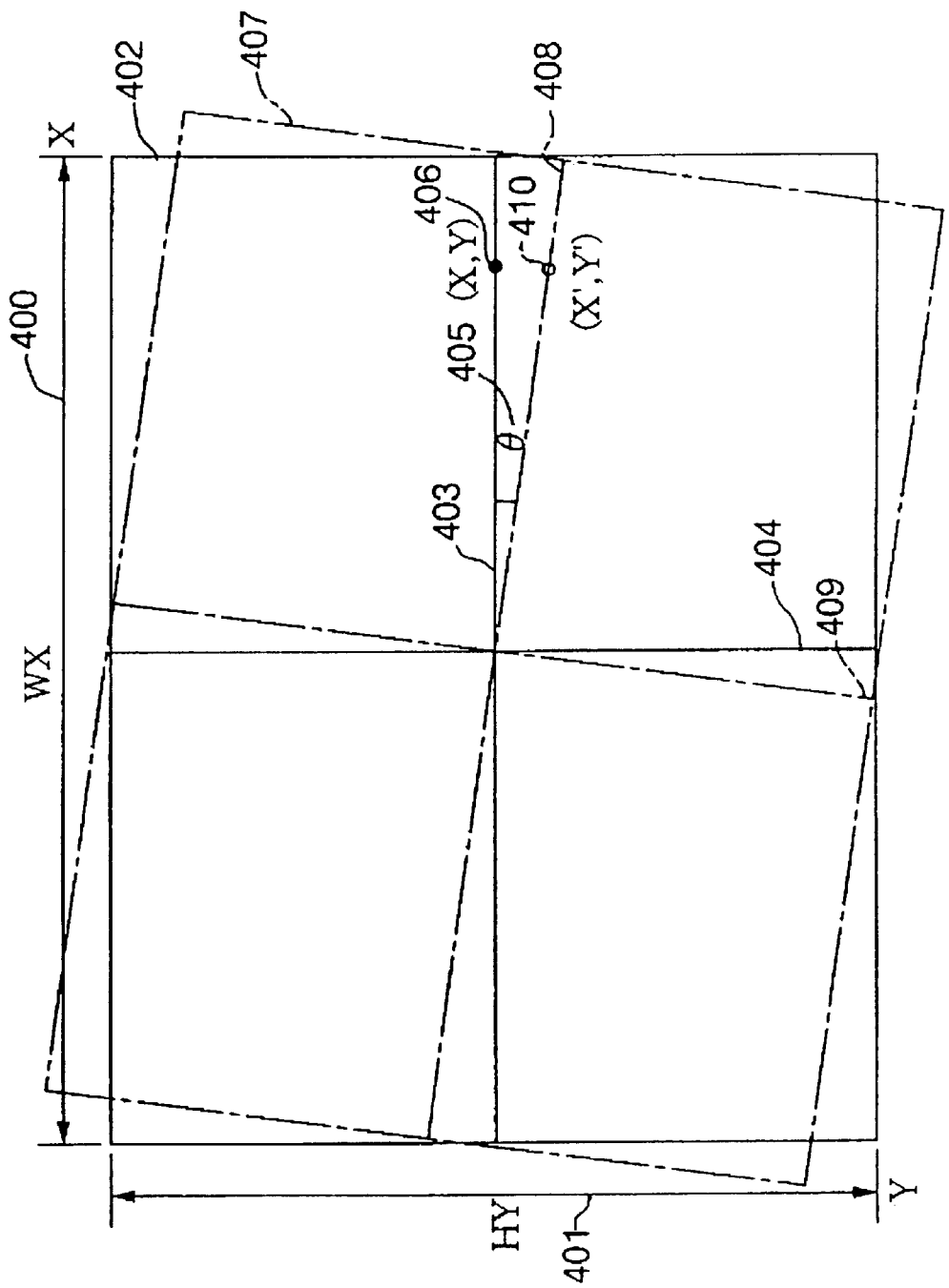
FIG. 4 is a figure for explaining the coordinate calculation formula.

Moreover, in FIG. 4, reference numeral 400 denotes the X axis (WX) of the touch panel 106, and 401 denotes the Y axis (HY) of the touch panel 106. Reference numeral 402 denotes the touch panel 106 before rotation, 403 denotes the center line in the X-direction of the touch panel 106 before rotation, 404 denotes the center line in the Y-direction of the touch panel 106 before rotation, 405 denotes the rotation angle θ of the touch panel 106, and 406 denotes the coordinates (X, Y) of the touch panel 106 before rotation.

Reference numeral 407 denotes the touch panel 106 after rotation, 408 denotes the center line in the X-direction of the touch panel 106 after rotation, 409 denotes the center line in the Y-direction of the touch panel 106 after rotation, and 410 denotes the coordinates (X, Y) of the touch panel 106 after rotation.

The rotated coordinate calculating program 305 calculates the Y-coordinate after rotation, based on the rotation angle and the Y-coordinate (length in the Y-direction) (step 604). The formula for calculating the Y-coordinate after rotation is:

$$Y' = Y \cos \theta - X \sin \theta \qquad \text{(Formula 2)}$$

When the rotation angle is less than 0 in step 601, steps 602 and 604 are skipped and proceeds to step 605. Then, the rotated coordinate calculating program 305 provides the X' and Y' calculated in steps 602 and 604 to the OS 300 (step 605), and ends the program.

When the touch panel control program 303 stores the rotation angle in the coordinate rotation angle retention area 306, the image rotation control program 304 ends the program. Moreover, 0 is preferably stored in advance the coordinate rotation angle retention area 306.

The present invention is not limited to the above embodiments, and can change of design when the change does not depart from the present invention.

What is claimed is:

1. A touch panel coordinate rotation device, which is provided in a touch panel device comprising a touch panel provided on the image plane of a display device and a coordinate detecting device for detecting the touched position on the touch panel and outputting the coordinates of the touched position, comprising:

a memory device for storing a rotation angle of an image on the display device based on the standard angle; and a coordinate calculating device for calculating the new coordinates by rotating the coordinate output from the coordinate detecting device at the rotation angle stored in the memory device, when the rotation angle stored in the memory device is not 0, wherein said coordinate calculating device calculates the new coordinates using the following formulas:

$$X' = X \cos \theta + Y \sin \theta$$

$$Y' = Y \cos \theta - X \sin \theta$$

wherein X and Y are the coordinates output from the coordinate detecting device, X' and Y' are the coordinates output from the coordinate calculating device, and θ is the rotation angle stored in the memory device.

* * * * *